United States Patent [19]

Adler et al.

[11] Patent Number: 4,673,918
[45] Date of Patent: Jun. 16, 1987

[54] LIGHT GUIDE HAVING FOCUSING ELEMENT AND INTERNAL REFLECTOR ON SAME FACE

[75] Inventors: Robert Adler, Northfield; John M. Jarosz, Skokie, both of Ill.

[73] Assignee: Zenith Electronics Corporation, Glenview, Ill.

[21] Appl. No.: 676,039

[22] Filed: Nov. 29, 1984

[51] Int. Cl.$^4$ .............................. G01V 9/04; G06F 3/02
[52] U.S. Cl. .................................. 340/365 P; 340/712; 455/612; 350/96.1; 350/96.18; 250/227
[58] Field of Search ...................... 340/365 P, 712, 710, 340/815.31; 455/612; 350/96.1, 96.18; 250/227

[56] References Cited

U.S. PATENT DOCUMENTS

| | | | |
|---|---|---|---|
| 3,060,319 | 10/1962 | Greunke | 250/227 |
| 3,611,359 | 10/1971 | Panerai | 340/815.31 |
| 3,775,560 | 11/1973 | Ebiling et al. | 178/18 |
| 4,459,476 | 7/1984 | Weissmueller et al. | 340/365 P |

*Primary Examiner*—James L. Rowland
*Assistant Examiner*—Ted Rittmaster
*Attorney, Agent, or Firm*—Cornelius J. O'Connor

[57] ABSTRACT

An improved light collector for use in a touch panel device which has a plurality of substantially parallel light beams directed across a display surface thereof, which collector collects the light in the light beams and redirects it in a direction substantially perpendicular to the light beams for detection by a light detector positioned adjacent one end of the light collector. The collector comprises a multi-sided elongated strip of light transmissive material having a longitudinal axis, and being terminated by a light collection station. A plurality of longitudinally spaced light focusing elements are disposed along a first side of the strip. A like plurality of longitudinally spaced light redirecting elements, likewise disposed along the first side of the strip, are individually paired with an assigned one of the light focusing elements and each such redirecting element has a light intercepting surface having transverse dimensions small in comparison to the cross-sectional dimensions of the strip. The light intercepting surface of each redirecting element is tilted with respect to the longitudinal axis of the strip. A like plurality of longitudinally spaced light reflectors are disposed along that side of the strip which is opposite the first side and each reflector is located at a point on the strip which is intermediate an assigned one of the light focusing elements and that element's paired light redirecting element.

12 Claims, 6 Drawing Figures

LIGHT GUIDE HAVING FOCUSING ELEMENT AND INTERNAL REFLECTOR ON SAME FACE

THE BACKGROUND OF THE INVENTION

This invention relates in general to a touch control arrangement for use in graphics display apparatus and in particular to an improved light collector, or guide, for use in such an arrangement.

Graphics display apparatus, of the type herein considered, generally utilize a cathode ray tube (CRT), although other types of display devices can also be used. In any event, each of two adjacent edges of the display surface (faceplate) is provided with a bank of light sources arranged to develop a cluster of parallel light paths which extend across the faceplate, the two clusters intersecting, preferably at right angles. Like banks of light detectors flank those sides of the faceplate opposite an assigned bank of light sources.

In practice, a particular graphic is delivered for display by a controller in response to an operator's command which can take the form of a pointing to one area of the faceplate. This pointing serves to interrupt one or more of the light beams, which interruption causes the beam's assigned light detector to develop a signal which is applied to the controller to select the particular graphic. U.S. Pat. No. 3,775,560 for example, exemplifies this type display apparatus.

Display apparatus of the type adverted to above tend to be rather costly since a separate light sensor is employed with each light source. By way of reducing the number of light sensors, a novel light collecting arrangement is disclosed in co-pending application Ser. No. 408,096 filed on Aug. 13, 1982, which application is continuation-in-part of application Ser. No. 264,725 filed May 18, 1981. The '096 application discloses a light collection scheme which employs two sheets of light transmissive material such as Plexiglass which are disposed on adjacent sides of acathode ray tube's faceplate. The forward end of each sheet receives light from the bank of light sources disposed opposite thereto and directs such light to a light collection area at the opposite end of the sheet. In one embodiment, a light sensor is disposed at each light collection area. In a preferred embodiment, however, a single light sensor is utilized to respond to both light collection areas.

While this arrangement reduces the number of light sensors required to respond to a multitude of light sources, the configuration of the light collecting sheet poses problems insofar as the designs of the CRT's cabinet and escutcheon are concerned. In particular, the extent to which compactness can be achieved is subject to the overall size, as well as shape, of the light collectors.

A problem which plagues same graphics display apparatus of the type herein considered is the desensitization of the light detectors by strong ambient light sources. In bright rooms or in bright daylight, the ambient light can cause the apparatus to display erroneous information, or, in the worst case, to be rendered inoperative. This can occur when ambient light stimulates the light detectors to such an extend as to render the detectors insensitive to the desired light beams.

A light collecting and redirecting device of the type herein considered must, as will subsequently be appreciated, comprise a series of very precisely formed and accurately spaced light controlling elements. The light guide described and claimed in copending patent application Ser. No. 595,170, filed Mar. 30, 1984, in the names of Robert Adler, et al, is particularly representative of such a device. To the extent that the field of use of applicant's device parallels that of the Adler et al light guide, so much of that disclosure as is appropriate to applicant's teaching, is expressly incorporated herein.

In any event, the tooling and molding processes entailed in making a precision, multi-element light guide are a formidable task. As will be shown, the relative locations of the several elements constituting a light collecting and redirecting group are of particular consequence as respects tooling and molding.

OBJECTS OF THE INVENTION

It is therefore a general object of the invention to provide an improved graphics display apparatus.

It is a specific object of the invention to provide a compact light collecting arrangement for use with a graphics display device.

It is also an object of the invention to provide a light guide for use with graphics display apparatus which imposes but minimal limitations on cabinet and escutcheon design.

It is another object of the invention to provide a light collector, or guide, for use with a graphics display device which is substantially immune to ambient light.

It is a specific object of the invention to provide a precision light collector device which is readily amenable to less costly tooling and molding.

BRIEF DESCRIPTION OF THE DRAWINGS

The features of the present invention which are believed to be novel are set forth with particularity in the appended claims. The invention, together with further objects and advantages thereof, may best be understood by references to the following description taken in conjunction with the accompanying drawings, in the several figures of which like reference numerals identify like elements, and which:

DESCRIPTION OF THE PREFERRED EMBODIMENT

The subject invention finds application in a wide variety of graphics display systems of the type controlled by detecting the interruption of intersecting paths of visible light or infrared radiation. The display device typically comprises a surface across which the intersecting paths of radiation are directed. That surface is frequently designated a "touch control panel" since display graphics, or other information, may be ordered up from a controller in response to an operator's command in the form of a touching of, or pointing to, a particular area of the surface to interrupt light emanating from one or more of the light sources. Detection and analysis of such interruption serves to identify X-Y coordinates of the interrupted light paths which, in turn, are determinative of the graphics to be displayed.

Figure 1:
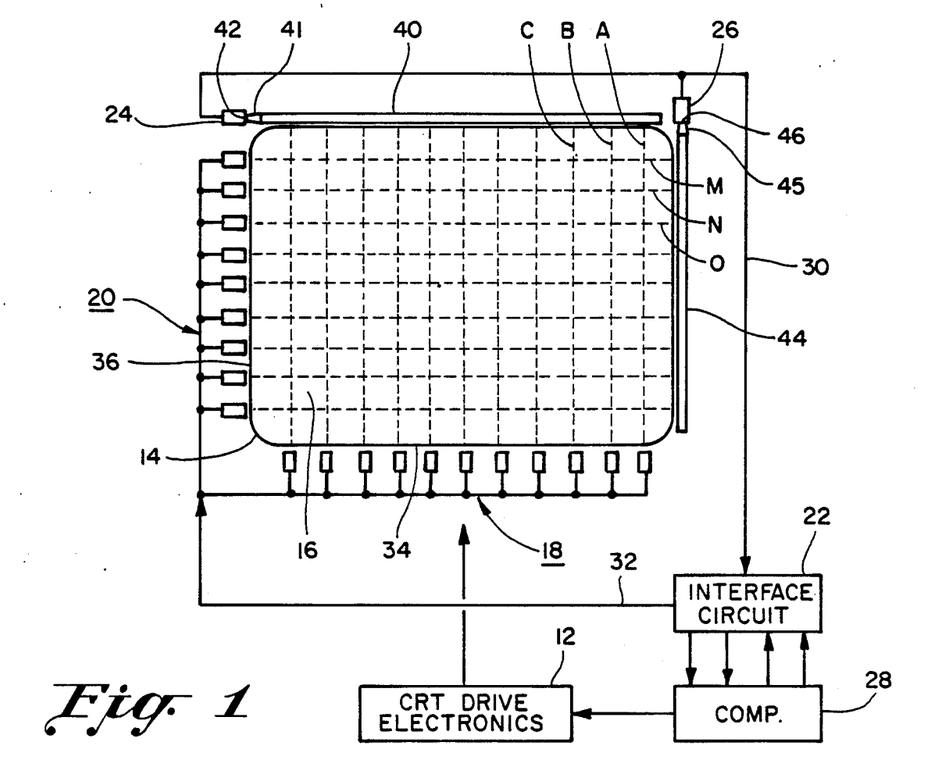
FIG. 1 depicts, partially in schematic form, a graphics display apparatus embodying the invention.

FIG. 1 depicts a graphics display apparatus 10 of the type adverted to above. Apparatus 10 comprises a graphics controller 12 and a display device 14 having a display surface 16. As noted above, since the device conventionally employed to display graphics is a CRT, the subject invention will be described in that environment. However, it is to be appreciated that the invention is readily applicable to other display devices, e.g., plasma panels, liqud crystal displays, projection screen displays, electroluminescent devices, etc., any of which can be employed in lieu of a CRT.

Apparatus 10 also includes first and second sources of radiant energy 18, 20, more specifically described below, which are disposed along adjacent edges of display surface 16. An interface circuit 22 is provided for stimulating the radiant energy sources to generate, effectively, a plurality of apparent discrete, time-sequentially occurring light sources collectively disposed along adjacent edges of display surface 16 for sourcing a like plurality of light paths individually associated with an assigned one of said light sources. In a manner detailed below, each light path is defined, conjointly by its associated light source and by a light collecting group arranged to accept only that light arriving within a predetermined range of angles centered upon a straight line extending from that light source. As a result, first and second clusters of parallel light paths extend across display surface 16, the two groups intersecting, preferably at right angles. Radiant energy sensing means, in the form of the light sensors 24, 26 respond to light energy directed thereto by the aforementioned light collectors which are constructed in accordance with the invention and which are fully described below.

Apparatus 10 further includes a computer 28 for rendering the interface circuit 22 operative in a patterned sequence so that when an interruption of a light path is detected by a light sensor and fed back to the computer, via interface circuit 22, the location of that interruption is identifiable by the computer.

Controller 12 comprises the drive electronics for the CRT and, to that end, serves to amplify and otherwise condition the output of computer 28. To achieve its functions, the computer comprises a clock (source of timing signals), a source of video information, as well as sources of horizontal and vertical sync pulses. The output of controller 12 is coupled to the control electrodes of CRT 14, as well as to the CRT's deflection windings, to display, under the direction of the computer, selected graphics. Accordingly, when the computer identifies the location, or address, of light path interruptions, it will then output the appropriate video information to controller 12 to change the video display to that associated with the address touched by the operator.

As shown in FIG. 1, interface circuit 22 has input and output terminals coupled to computer 28, an input terminal coupled, via a buss 30, to light sensors 24, 26 and an output terminal coupled to radiant energy sources 18, 20 via the buss 32. Circuit 22 in response to timing signals from computer 28, outputs firing signals that stimulate radiant energy sources 18, 20 via buss 32 in a patterned sequence so that the location of a subsequent interruption of a particular light path is identifiable.

To more particularize the foregoing, the first source of radiant energy 18 is disposed along a first edge 34 of CRT display surface 16 while the second source of radiant energy 20 is disposed along a second adjacent edge 36 of surface 16. When stimulated each of energy sources 18 and 20 generates, effectively, a plurality of apparent discrete, time-sequentially occurring light sources collectively disposed along respective edges 34, 36 of display surface 16.

In a practical realization of the invention, energy sources 18, 20 each comprise a bank of light emitting diodes (LED's), arranged as depicted in FIG. 1. The source 18 LED's serve to source a like plurality of light paths A, B, C . . . , individually associated with an assigned LED, and extending across display surface 16 parallel to the minor, or vertical, axis of that surface. Each of light paths A, B, C . . . is defined, conjointly, by its associated LED and by a light collecting group, fully described below, arranged to accept only that light arriving within a predetermined range of angles centered upon a straight line extending from its associated LED.

In like fashion, source 20 LED's source a plurality of light paths M, N, O . . . , likewise individually associated with an assigned LED and extending across surface 16 parallel to the major, or horizontal, axis of surface 16 to orthogonally intersect paths A, B, C . . . Each of light paths M, N, O . . . is also defined conjointly, by its associated LED and by a light collecting group, described below, arranged to accept only that light arriving within a predetermined range of angles centered upon a straight line extending from its associated LED.

Preferably, to conserve space, the LED's of each bank are mounted in a common plane, although that is not to be construed as a limitation to the invention.

Alternatively, instead of resorting to a multiplicity of LED's as discrete light sources, advantage can be taken of the invention described and claimed in co-pending application Ser. No. 340,604, which was filed on Jan. 19, 1982, now U.S. Pat. No. 4,459,476. That invention teaches replacing the LED's with radiation-emissive material arranged in the form of strips which are disposed within a CRT envelope along adjacent edges of the display surface. More particularly, and as disclosed in the '476 patent, the strips of radiation emissive material are deposited inside the tube envelope at, or near, the point where the edge of the display surface meets or blends with the envelope funnel. The strips emit radiation upon being excited by a travelling spot of energy, for example, an electron beam. The '476 patent details the manner in which the phosphor material is excited to issue radiant energy, as well as the manner in which light sensors are disposed for response to the radiated energy. That patent also discloses methods for electron beam scanning the strips by computer control, so that, effectively, a plurality of apparently discrete, time-sequentially occurring light sources are caused to appear along both strips. Since the computer controls the sequence in which the strips are excited, it can identify signals attributable to particular ones of the time-sequentially occurring light sources. Accordingly, the absence of timely signals from the sensors can be interpreted by the computer as an interruption of known light paths. Therefore, the X-Y coordinates of the interruption are identifiable.

Figure 2:
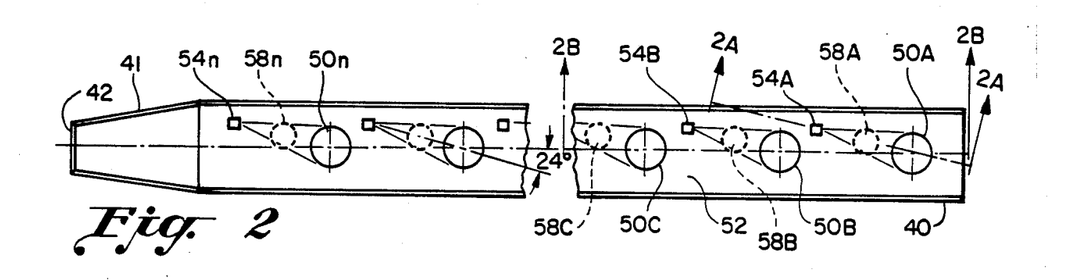
FIG. 2 is a plan view of a light guide constructed in accordance with the invention.
Figure 3:
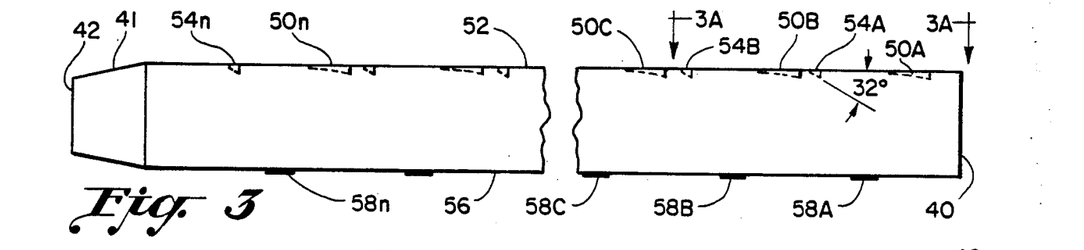
FIG. 3 is an elevational view of the light guide shown in FIG. 2.

As shown in FIG. 1, there is disposed along that edge of display surface 16, opposite light source 18, a first light collector means comprising a guide 40 in the form of an elongated, rectilinear, substantially rectangular (in cross-section) strip of light transmissive acrylic material, such as Plexiglass grade V920, see also FIGS. 2 and 3. The guides herein disclosed are designed for use with a flat-face CRT display device. In the event that it is desired to utilize the improved light guiding arrangement described herein with a conventional curved face panel display device, it is only necessary to form the guide to have an arcuate configuration relative to its longitudinal axis. A guide of such configuration, but having a light guiding arrangement different than that herein disclosed, is described and claimed in copending application Ser. No. 595,170 which was filed on Mar. 30, 1984 in the names of Rober Adler, et al.

Light guide 40 comprises a main body portion of substantially constant cross-section, see FIGS. 2 and 3, that merges with a tapered end section 41 which, in turn, is terminated by a light collection station 42 that confronts light sensor 24. This taper results in a reduced cross-sectional area for the light collection station, thus permitting use of a conventional, relatively inexpensive, photodiode for a light sensor. As significantly, the taper is chosen so as to afford a transition from the main body of the guide to the light collection station that will ensure that the internally reflected light rays traversing the length of the guide will not be subjected to angles of reflection exceeding the critical angle which would permit the light rays to exit from the guide.

In practice, sensor 24 is cemented to the end of station 42 by a transparent adhesive to most efficiently utilize the light collected by guide 40. A second similarly formed, but shorter, light guide 44 is disposed along that edge of display surface 16 opposite light source 20 and it also comprises a tapered end section 45 which is terminated by a light collection station 46 that confronts light sensor 26. In like fashion, and for the same reason, sensor 26 is cemented to station 46.

The disparity in the lengths of the two guides is dictated, of course, by the fact that the display surface (in the disclosed embodiment) is the rectangular faceplate of a CRT. Moreover, when the practioner opts for a display device having a flat panel, the rectilinear formed guide disclosed herein is in order. On the other hand, when resort is had to a conventional CRT, the guides would adopt an arcuate, rather than rectilinear, construction to conform to the curvature of the CRT faceplate which, in practice, comprises a section of a sphere. Then the curvature, or arc, of the light guides would have a radius determined by the radius of curvature of the CRT face plate. The light guides disclosed in the above-mentioned Adler et al application adopt such an arcuate configuration.

In any event, with guides 40, 44 disposed in the fashion depicted in FIG. 1, light intercepted by the guides will, in a manner to be described, be redirected to respective light collection stations 24, 26.

Figure 2A:
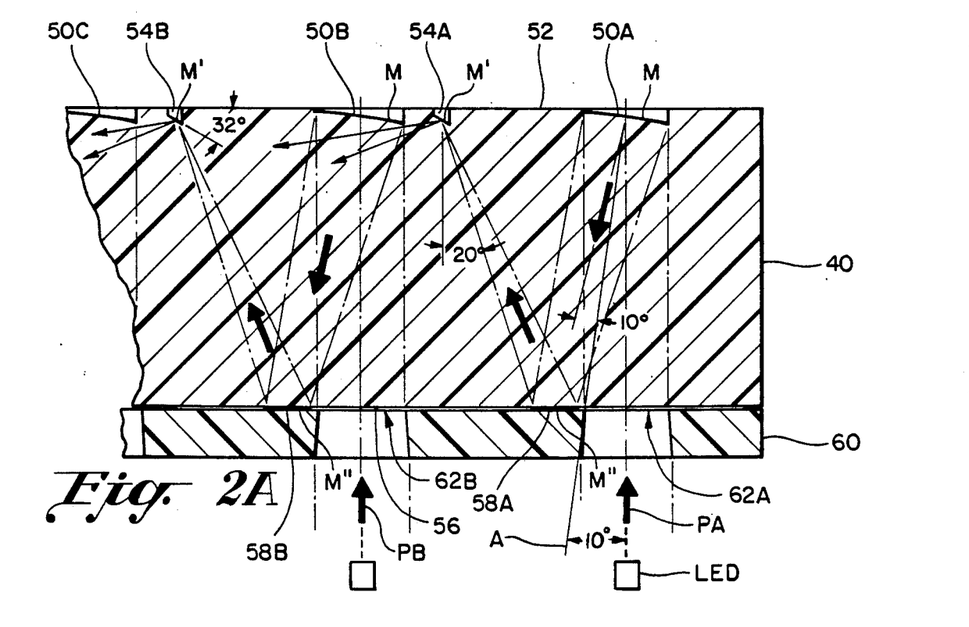
FIG. 2A is a sectional view taken along lines 2A—2A, in FIG. 2, detailing two groups of light collecting and redirecting elements.

As noted, except for length, light guides 40, 44 are basically similar. Therefore, a detailed description will be given only for guide 40 which description, of course, is applicable to guide 44. More particularly, and with reference to FIGS. 2, 2A, 2B, 3 and 3A, light guide 40 is seen to comprise a plurality of longitudinally spaced discrete focusing elements 50A, 50B, 50C ... 50n which are arrayed, and equally spaced, along a flat first side, or face, 52 of guide 40, that is, the face more distant from light source 18. It is to be appreciated, of course, that the focusing elements need not necessarily be impressed into the guide, as shown in FIG. 2A, however, such an arrangement is readily achieved by resort to modern molding techniques in which a properly formed tool is included in the mold to effectively implant the array of focusing elements. For guide 40 the number of focusing elements 50A-50N in its array is equal to the number of LED's in light source 18. By the same token, the number of focusing elements in guide 44 matches the number of LED's in light source 20. Each of elements 50A-50n is individually affiliated with an assigned LED, as graphically depicted in FIG. 1, by one of light paths A, B, C ....

In the disclosed embodiment each of focusing elements 50A-50n is configured as a concave mirror, having in one execution of the invention a spherical radius R of 0.966" for collecting and focusing that light arriving within a defined light path extending from its affiliated LED. More particularly, and with reference to FIGS. 2A and 2B, each of the aforesaid light paths is defined, conjointly, by its associated LED and by a focusing element 50A-50n which is arranged to accept only that light arriving there at a predetermined range of angles centered upon a straight line PA extending from element 50A, for example, to the depicted LED and at right angles to surface 52 of the guide. For a light guide having the dimensions catalogued below, an acceptable range of angles would be ±0.61 degrees (centered on line PA and looking back from element 50A to the LED) in the plane defined by the plurality of light paths A,B,C ... , and substantially more, for example ±2 degrees, in a plane orthogonal to said first plane. Desirably, mirror 50A is metallized, as indicated by the reference M in FIG. 2A, to enhance its reflectivity.

Guide 40 further comprises a like plurality of longitudinally spaced, discrete, light redirecting elements 54A-54n which are likewise arrayed, and equally spaced, along face 52 of guide 40. Each redirecting element 54A-54n is individually paired with an assigned one of focusing elements 50A-50n and it has transverse dimensions which are small in comparison to the cross-sectional dimensions of the guide. The surface of each of redirecting elements 54A-54n is tilted with respect to the longitudinal axis of the guide. The redirecting elements 54A-54n, as well as the focusing elements 50A-50n, are readily formed during the molding process by including properly shaped tools within the mold, which tools serve to form the arrays of impressions upon the acrylic material when the material is forced into the mold to form the guide. Thereafter, the outer, i.e. accessible, surfaces of the thus-formed focusing elements and redirecting elements are metallized, as indicated by M and M, to enhance reflectivity. It is appreciated that the outer surfaces of the redirecting elements may not need to be metallized. The determining factor is the angle of incidence of the extreme rays of the bundle of light rays focused on redirector 54A by mirror 50A. If the angle of incidence is too low, then the redirector must be metallized; if it is above the critical angle for total internal reflection then it does not. It is further to be appreciated that planarity of redirecting elements 54A-54n is not an absolute; a departure to some concavity, or convexity, is acceptable.

Guide 40 additionally comprises a like plurality of longitudinally spaced, discrete light reflecting elements 58A-58n which are arrayed and equally spaced along face 56 of guide 40, which face is disposed opposite to and parallel to face 52, see FIG. 2A. Each reflector is located at a point on face 56 which is intermediate an assigned one of light focusing elements 50 and that element's paired light redirecting element 54. Reflectors 58A–58n are formed on the flat, polished surface 56 by a process such as evaporating aluminimum through a mask. No mechanical shaping involved. The metallization is indicated in FIG. 2A by M.

To recapitulate, insofar as the placement and functioning of the guide 40 light collecting elements are concerned, each of focusing elements 50A–50n is oriented and configured to collect and focus light arriving within that one of the defined light paths extending from the LED light source affiliated with that focusing element and to direct such collected light, via its assigned one of reflectors 58A–58n, to that one of light redirecting elements 54A–54n paired therewith. Particularizing, focusing element 50A is spaced from its paired light redirecting element 54A an optical distance such that the redirecting element 54A is positioned at, or close to, the focal plane of its paired focusing element 50A. Additionally, associated light redirecting element 58A is so oriented, relative to the longitudinal axis of the guide, as to direct light received from its paired focusing element 50A toward light collection station 42.

A particularly advantageous arrangement for the disclosed light collecting arrangement is detailed in FIG. 2A. Light redirecting element 54A is so positioned and configured that only light arriving along the aforementioned path PA, within the specified tolerances and captured and focused by mirror 50A and then relayed by reflector 58A, is focused upon light redirector 54A. As noted, the transverse dimensions of redirector 54A are so chosen that only light arriving within the aforementioned acceptable range of angles around path PA can ultimately strike its surface. Light arriving at larger angles with respect to path PA will miss reflector 58A and strike guide surface 56 at such a steep angle that total reflection does not occur and such light is not retained in the guide.

Figure 3A:
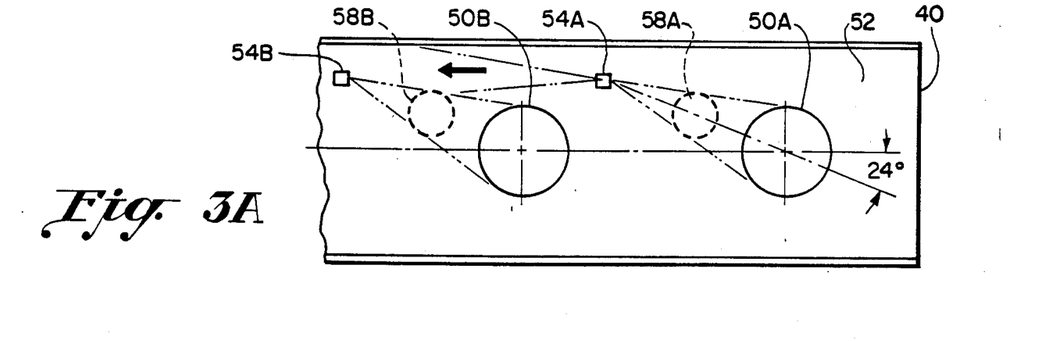
FIG. 3A is a top view of a portion of a light guide taken long lines 3A—3A in FIG. 3 and depicting two groups of light collecting and redirecting elements.

While like elements within each of arrays 50A–50n, 54A–54n and 58A–58n are longitudinally spaced, relative to the axis of guide 40, the elements of a group comprised of a focusing mirror, a reflector and a redirector and affiliated with an assigned LED light source, are spatially aligned in a common plane that need not be parallel to the longitudinal axis of guide 40; in one execution illustrated in FIGS. 2 and 3A, the common plane intersects the longitudinal axis of guide 40 at an angle of approximately 24 degrees. Preferably, the spatial alignment of the elements within each group is such that the center-to-center spacing between, for example, reflector 58A and focusing mirror 50A is the same as the center-to-center spacing between that reflector and its redirector 54A. The depicted skewing of each light collecting group is resorted to in order to accommodate, for a given length of guide 40, the maximum number of such groups. Specifically the longitudinal spacing of focusing elements 50A–50n is dictated by the number and spacing of the LED light sources. In practice, the LED light sources can be very closely spaced. However, there are finite, practical limits as to how close the plurality of sections of the tool employed to form an array of, say, light focusing elements 50A–50n can be spaced without interfering with the tool sections employed to form the array of light redirecting elements 54A–54n paired therewith. This spacing limitation is dictated by virtue of the fact that the light focusing element forming tool must be located on the same side of the guide mold as the light redirecting element forming tool. Thus by resort to the above described skew arrangement, sufficient spacing is available between serially disposed elements of the several arrays to accommodate the aforementioned tooling.

In one approach to the problem of designing a light guide for use in an application calling for a substantial number of closely spaced light paths, the dimensioning and spacing of the three elements forming a light focusing and redirecting group can be predicated upon the physically smallest element of the group, i.e., the redirector. From a practical standpoint, the dimensions of that element desirably should not impose unreasonable constraints upon mold and tooling construction.

Now, upon selecting a redirector say, 54A, of a size that can be so tolerated, consideration is then given to the fact that the size of the redirector determines the field of view of focusing mirror 50A, for a given focal length of that mirror. Since it is desirable to constrict the field of view of the redirector to light arriving along path PA and within the aforesaid acceptable range of angles around PA, the focal length of focusing mirror must be increased if that acceptable range is small. Absent reflector 58A, this would entail substantially increasing the thickness of the guide. However, by resort to the three element light collecting and redirecting arrangement described herein, specifically the inclusion of the reflecting element 58A, the focal length of focusing mirror 50A is doubled without increasing the thickness of the guide.

The advantages of the described arrangement for each light focusing and redirecting group are, at least, four-fold: first, the placement and dimensioning of the mirrors are such that they pose but a minimal obstacle to the redirected light rays traversing the guide, secondly, the angular positioning and dimensioning of the mirrors ensure total internal reflection within the guide of the light collected and redirected by the mirror pair; the positioning of the focusing element 50A and its paired redirector 54A upon the same face of the guide permits forming them from the same piece of tooling to facilitate holding their spacing within a close tolerance and finally, the skew arrangement admits of the maximum number of light focusing and redirecting groups commensurate with practical tooling and molding considerations.

In general, a light guide with parallel major surfaces has the property that light which enters through those surfaces is not totally reflected within the guide and thus is soon lost, in contrast to light which enters through minor surfaces, for example at one end of the guide, which may be totally reflected and thus remain in the guide. In a guide constructed according to the present invention this rule generally applies. However, it is possible for light arriving under certain angles at specific portions of surface 56 to strike one of the focusing mirrors 50A for example, in such a way that the reflected light, while missing planar mirror 58A by a wide margin, is totally reflected by surface 56 and thus remains within the guide. To suppress this source of potential interference, a light collimator 60 can be fitted to surface 56 of the guide, see FIGS. 2A and 2B. Preferably, the collimator adopts the form of a relatively thick strip of black plastic which is ported to establish an array of apertures 62A–62n in registration with the light paths PA-Pn issuing from the source 18 LED's. The length and width of the collimator approximates that of guide 40.

Figure 2B:
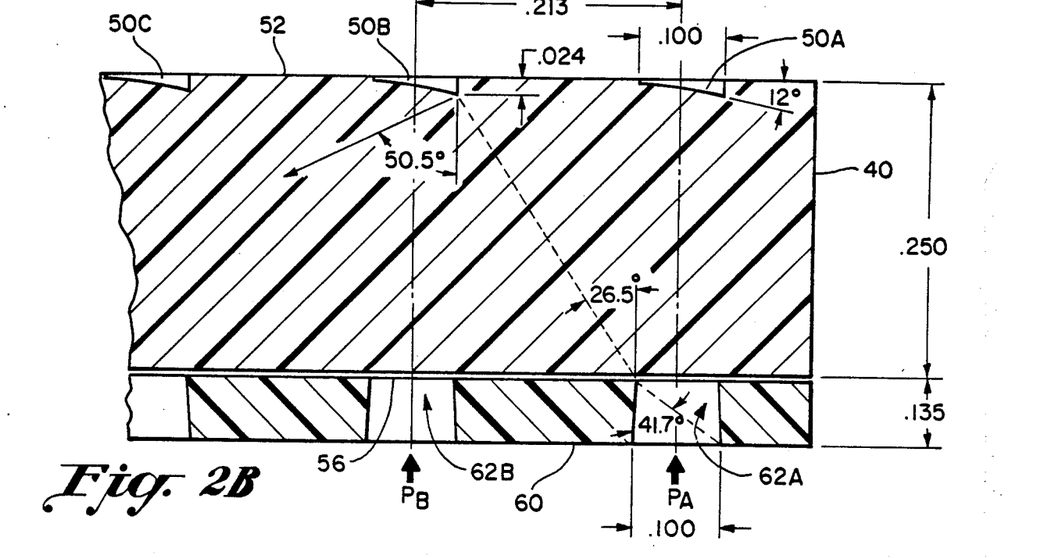
FIG. 2B is a sectional view taken along lines 2B—2B, in FIG. 2, detailing the parameters of a focusing mirror employed in a light collecting and redirecting group.

FIG. 2B shows a section through the centers of a series of serially disposed focusing mirrors 50A and 50B. Dimensions shown are those for a particular set of specifications; specifically, aperture pitch=0.213", guide 40 height=0.250", focus mirror 50 aperture=0.100". This leaves just 0.113" between apertures. Let us assume that instead of thick collimator 60 shown in the figure, a thin shield (the sheet of black paper, shown in the above referenced Adler et al application) covers surface 56 except for the 0.100" round apertures 62A, 62B aligned with focusing mirrors 50A, 50B, respectively. The sketch shows a ray from the left edge of aperture 62A to the right edge of focusing mirror 50B. For the dimensions given, this ray is inclined 26.5 degrees from the vertical; because the right edge of each focusing mirrors is tilted 12 degrees to the left, 2×12=24 degrees are added to the angle of incidence as the ray is reflected. Its tilt from the vertical is therefore 26.5+24=50.5 degrees, enough to be traped rays in the guide and pass them on to the light collection station 42 to the left.

To be tilted from the vertical by 26.5 degrees inside an acrylic guide (refractive index n=1.49), the external angle of incidence of a light ray must be 41.7 degrees as shown. However, such a ray could not enter the aperture if there were an obstacle, in the form of a cylindrical wall around the aperture 0.112" or more in length. Thus, with the dimensions shown, and with precise alignment of the collimator holes about the center of each focusing mirror, the collimator thickness must be equal to or larger than 0.112".

Rays striking the 0.100" aperture in surface 56 under an angle steeper than 41.7 degrees are admitted by the collimator but strike surface 52 in the flat area between focusing mirrors 50A and 50B, and are not totally reflected and thus fade out. Rays approaching from the outside under angles flatter than (i.e. angles of incidence larger than) 41.7 degrees are completely intercepted by the collimator.

In practice, alignment between collimator holes and focusing mirror centers will not be perfect, in addition, the collimator holes must be flared slightly to permit easy molding. Taking into account practical tolerances, the collimator minimum thickness desirably is increased to 0.135".

Note that rays approaching from the left (as viewed in FIG. 2B) could never become a problem, because of the asymmetry of the focusing mirror. Thus, the left side walls of the collimator holes are really not needed. They do no harm, however, and since it is easier to form and align cylindrical (or slightly conical) holes that is the preferred construction.

FIG. 2B also makes clear that when the apertures are moved further apart, the 26.5 degree angle increases. Assuming the guide 40 height (0.250"), the height of the right edge of the focusing mirror 50B (0.024") and focusing mirror aperture (0.100") to remain constant, an angle of 42.2 degrees is reached when the aperture pitch is 0.305". At this point, the external angle of incidence becomes 90 degrees and the required collimator thickness drops to zero; beyond this point, only a thin shield (such as disclosed in the aforesaid Adler et al application) is needed, since it is now impossible for outside light entering aperture 62A to strike any part of focusing mirror 50B.

In a preferred embodiment of the invention the geometric central axis A of mirror 50A is tilted forward, that is toward collection station 42, by approximately 10 degrees. In other words, the axis of mirror 50A is tilted 10 degrees relative to path PA, so that the angle of incidence of a central light ray from mirror 50A upon planar reflector 58A is 20 degrees (2 times 10 degrees), see FIG. 2A. As shown, planar reflector 58A is disposed parallel to the longitudinal axis of the guide. With this orientation for mirror 58A, a central light ray received from its focusing mirror 50A is directed along a path that impinges the center of redirector 54A. Mirror 54A, in turn, is titled at an angle to guide surface 52. Specifically, this angle may be 35 degrees (45 degrees − 10 degrees). With this inclination, and with appropriate orientation of mirror 54A about an axis parallel to path PA, a central light ray from its paired focusing mirror 50A is redirected along a path substantially parallel to the longitudinal axis of the guide, to light collection station 42. This arrangement has the slight disadvantage that a small portion of the redirected light, after leaving redirector mirror 54A, is intercepted by the following redirector mirror. To avoid such partial interception, the tilt of mirror 54 may be changed to, for example, 32 degrees, so that the emerging light cone misses the following redirector mirror, as shown in FIG. 2A. Additionally, the aforesaid angular relationships, in conjunction with the mirror's dimensional parameters ensure that the outer rays received from a focusing mirror 50A are reflected and redirected at angles that ensure their total internal reflection on their way to light collection station 42.

By way of an exemplification of the invention, but not to be construed as limiting in any way, a light guide 40 designed for use with a 12" V CRT display device has the following specifications:

| Number of light collecting groups 50A, 58A, 54A | 40 (horiz.), 30 (vert.) |
| --- | --- |
| Mirror 50A to mirror 50B spacing | .213" |
| Mirror 50A to redirector 54A spacing | .168" |
| Guide 40, Overall length (approx.) | 10" |
| Guide 40, Transverse Dim. (approx.) | .220" × .250" |
| Guide 40, Index of Refraction (approx.) | 1.49 |
| Mirror 50A, Diameter | .100" |
| Reflector 58A, Diameter | .050" |
| Mirror 50A, Spherical radius | .966" |
| Mirror 50A to reflector 58A spacing | .084" |
| Redirector 54A, transversed dim. (approx.) | .007" × .020" |
| Light station 42 transverse dim. (approx.) | .120 × .120" |
| Collimator 60, thickness | .135 |

While the invention has been described in terms of a preferred embodiment, it will be obvious to those skilled in the art that changes and modification may be made without departing from the invention in its broader aspects. Accordingly, it is intended that all such changes and modifications be considered as within the spirit and scope of the invention as defined by the appended claims.

What is claimed is:

1. For use in a touch panel graphics display apparatus having means for producing a plurality of substantially parallel light beams directed across a display surface of said apparatus, an improved light collector means for collecting the light in said light beams and for redirecting it in a substantially common direction substantially perpendicular to said light beams for detection by a common light detector positioned adjacent one end of said light collector means,     said improved light collector means comprising:
        a multi-sided elongated strip of light transmissive material having a longitudinal axis, and being terminated by a light collection station;

a plurality of longitudinally spaced light focusing elements disposed along a first side of said strip;

a like plurality of longitudinally spaced light redirecting elements likewise disposed along said first side of said strip, individually paired with an assigned one of said light focusing elements and individually having a light intercepting surface having transverse dimensions small in comparison to the cross-sectional dimensions of said strip, said light intercepting surface of each said redirecting element being tilted with respect to said longitudinal axis of said strip;

a like plurality of longitudinally spaced light reflectors disposed along that side of said strip opposite said first side and each located at a point thereon intermediate an assigned one of said light focusing elements and that element's paired light redirecting element, each said focusing element being oriented and configured to collect light received from a direction substantially perpendicular to said longitudinal axis of said strip and to direct such collected light, via its said assigned reflector, to said redirecting element paired with said focusing element, each said focusing element being spaced from its paired redirecting element an optical distance such that said redirecting element is positioned at, or close to, the focal plane of its paired focusing element, each said light redirecting element being so oriented, relative to said longitudinal axis, as to direct light received from its said paired assigned focusing element toward said light collection station.

2. The light collector means set forth in claim 1 in which said focusing elements are equally spaced along said first side of said strip, said redirecting elements are likewise equally spaced along said first side of said strip and said light reflectors are equally spaced along side of said strip opposite said first side.

3. The light collector means set forth in claim 1 in which said light strip comprises a tapered section interposed between said array of light redirecting elements and said light collection station to concentrate said redirected light.

4. The light collector means set forth in claim 1 in which each of said focusing elements comprises a curved mirror of predetermined radius, each of said light reflectors comprises a planar mirror and each of said light redirecting elements comprises a mirror.

5. The light collector means set forth in claim 1 in which one of said light focusing elements, one of said light redirecting elements and one of said light reflectors constitute a light collecting and redirecting group, and in which said elements of said group are spatially aligned in a common plane that intersects said longitudinal axis of said light transmitting strip at a predetermined angle.

6. The light collection means set forth in claim 4 in which each of said light reflectors comprises a circular planar mirror.

7. The light collection means set forth in claim 5 in which each of said light redirecting elements comprises a retangular planar mirror.

8. In a graphics display apparatus having:
a graphics controller,
a display device having a display surface,
a radiant energy source means, and
means for stimulating said radiant energy source to generate, effectively, a plurality of apparent discrete, time-sequentially occurring light sources collectively disposed along at least one edge of said display surface for sourcing a like plurality of light paths individually associated with an assigned one of said light sources, each of said light path being defined, conjointly, by its said associated light source and by a light collector means arranged to accept only that light arriving within a predetermined range of angles centered upon a straight line extending from said associated light source, said light paths extending across said display sourface, radiant energy sensing means responsive to the output of said light sources and means for rendering said stimulating means operative in a patterned sequence so that the interruption of a particular one of said light paths is identifiable, said display surface serving to display graphics ordered by said controller in response to an operator's command in the form of a pointing to a particular area of said display surface, which pointing interrupts at least one of said light paths, the improvement comprising:

a light collector means comprising an elongated multi-faced guide of light transmissive material having a longitudinal axis and being terminated by a light collection station confronting said radiant energy sensing means, said collector means being disposed along that edge of said display surface opposite said one edge for directing light intercepted from any of said plurality of light sources, to said collection station, provided that said intercepted light arrives at said collector within one of said defined light paths, said light collector means further comprising an array of longitudinally spaced discrete focusing elements disposed along a first face of said guide and individually affiliated with an assigned one of said light sources, a like array of discrete longitudinally spaced light redirecting elements likewise disposed along said first face of said guide, each said redirecting element being individually paired with an assigned one of said focusing elements and individually having a light intercepting surface having transverse dimensions small in comparison to the cross-sectional dimensions of said guide, said light intercepting surface of each said redirecting element being tilted with respect to said longitudinal axis of said guide;

a like array of longitudinally spaced discrete planar light reflectors disposed along that face of said guide opposite said first face and each located at a point thereon intermediate an assigned one of said light focusing elements and that element's paired light redirecting element, each said focusing element being oriented and configured to collect and focus light arriving within that one of said defined light paths extending from said light source affiliated with said focusing element and to direct such collected light, via its said assigned reflector, to said redirecting element paired with said focusing element, each said focusing element being spaced from its paired redirecting element an optical distance such that said redirecting element is positioned at, or close to, the focal plane of its paired focusing element, each said light redirecting element being so oriented, relative to said longitudinal axis of said guide, as to direct light received from its said paired assigned focusing element toward said light collection station.

9. The improvement set forth in claim 8 in which said light collector guide has a configuration, relative to its longitudinal axis, conforming to the contour of that edge of said display surface along which it is disposed.

10. The improvement set forth in claim 8 further comprising a light collimator disposed adjacent said face of said guide opposite said first face and being ported to establish an array of apertures individually in registration with an assigned one of said light paths.

11. The improvement set forth in claim 10 in which said collimator comprises a strip of black plastic having a length and width approximating that of said guide and a dimension in the direction of said light paths that is not less than 40% of the thickness of said guide in the same direction.

12. In a graphics display apparatus having:
a graphics controller,
a display device having a display surface,
a first source of radiant energy,
a second source of radiant energy,
means for stimulating said radiant energy sources to generate, effectively,
a first plurality of apparent discrete, time-sequentially occurring light sources from said first source of radiant energy which are collectively disposed along a first edge of said display surface for sourcing a first plurality of light paths individually associated with an assigned one of said first light sources,
each of said first plurality of light paths being defined, conjointly, by its said associated light source and by a first light collector means arranged to accept only that light arriving within a predetermined range of angles centered upon a straight line extending from its said associated one of said first plurality of light sources,
and to generate, effectively, a second plurality of apparent discrete, time-sequentially occurring light sources from said second source of radiant energy which are collectively disposed along a second edge of said display surface for sourcing a second plurality of light paths individually associated with an assigned one of said second light sources,
each of said second plurality of light paths being defined, conjointly, by its said associated light source and by a second light collector means arranged to accept only that light arriving within a predetermined range of angles centered upon a straight line extending from its said associated one of said second plurality of light sources,
said first and second pluralities of light paths extending across said display surface,
first and second radiant energy sensors individually responsive to the output of an assigned one of said first and second pluralities of light sources, respectively, and means for rendering said stimulating means operative in a patterned sequency so that the interruptions of particular ones of said light paths are identifiable,
said display surface serving to display graphics ordered by said controller in response to an operator's command in the form of a pointing to a particular area of said display surface, which pointing interrupts at least one light path associated with each of said first and second pluralities of light sources, the improvement comprising:
a first light collector means comprising a guide in the form of an elongated multi-faced guide of light transmissive material having a longitudinal axis and being terminated by a first light collection station confronting said first radiant energy sensor,
said first guide being disposed along that edge of said display surface opposite said first edge for directing light intercepted from any of said first plurality of light sources to said first light collection station provided that said intercepted light arrived at said first guide within one of said first plurality of defined light paths,
said first guide comprising an array of discrete light focusing elements disposed along one face of said first guide and individually affiliated with an assigned one of said first plurality of light sources,
and also comprising a like arrange of discrete longitudinally spaced light redirecting elements likewise disposed along said one face of said first guide,
each said redirecting element of said first guide being individually paired with an assigned one of said focusing elements of said first guide and individually having a light intercepting surface having transverse dimensions small in comparison to the cross-sectional dimensions of said first guide,
said light intercepting surface of each said redirecting element being tilted with respect to said longitudinal axis of said first guide,
said first guide further comprising a like array of longitudinally spaced discrete planar light reflectors disposed along that face of said first guide opposite said one face and each located at a point thereon intermediate an assigned one of said first guide light focusing elements and that element's paired light redirecting element,
each said first guide focusing element being oriented and configured to collect and focus light arriving within that one of said first plurality of defined light paths extending from that one of said first plurality of light sources affiliated with said first guide focusing element and to direct such collected light, via its said assigned reflector, to said redirecting element paired with said first guide focusing element,
each said first guide focusing element being spaced from its paired redirecting element an optical distance such that said paired redirecting element is positioned at, or close to, the focal plane of its paired first guide focusing element,
each said first guide light redirecting element being so oriented, relative to said longitudinal axis of said first guide, as to direct light received from its said paired assigned focusing element to said first light collection station,
said improvement further comprising;
a second light collector means comprising a guide in the form of an elongated multi-faced guide of light transmissive material having a longitudinal axis and being terminated by a second light collection station confronting said second radiant energy sensor, said second guide being disposed along that edge of said display surface opposite said second edge for directing light intercepted from any of said second plurality of light sources to said second light collection station provided that said intercepted light arrived at said second guide within one of said second plurality of defined light paths, said second guide comprising an array of discrete light focusing elements disposed along one face of said second guide and individually affiliated with an assigned one of said second plurality of light sources, and also comprising a like array of discrete longitudinally spaced light redirecting elements likewise disposed along said one face of said second guide, each said redirecting element of said second guide being individually paired with an assigned one of said focusing elements of said second guide and individually having a light intercepting surface having transverse dimensions small in comparison to the cross-sectional dimensions of said second guide, said light-intercepting surface of each said redirecting element being tilted with respect to said longitudinal axis of said second guide, said second guide further comprising a like array of longitudinally spaced discrete planar light reflectors disposed along that face of said second guide opposite said one face and each located at a point thereon intermediate an assigned one of said second guide light focusing elements and that element's paired light redirecting element, each said second guide focusing element being oriented and configured to collect and focus light arriving within that one of said second plurality of defined light paths extending from that one of said second plurality of light sources affiliated with said second guide focusing element and to direct such collected light, via its assigned reflector, to said redirecting element paired with said second guide focusing element, each said second guide focusing element being spaced from its paired redirecting element an optical distance such that said paired redirecting element is positioned at, or close to, the focal plane of its paired second guide focusing element, each said second guide light redirecting element being so oriented, relative to said longtitudinal axis of said second guide, as to direct light received from its said paired assigned focusing element to said second light collection station.

* * * * *